(12) United States Patent
Jans

(10) Patent No.: US 6,752,923 B1
(45) Date of Patent: Jun. 22, 2004

(54) PERMANENT MAGNETIC LIQUID TREATING DEVICE

(76) Inventor: Manfred Ernst Jans, Bahnhofstrasse 5 D-55437, Ockenheim (DE)

( * ) Notice: Subject to any disclaimer, the term of this patent is extended or adjusted under 35 U.S.C. 154(b) by 0 days.

(21) Appl. No.: 10/070,100
(22) PCT Filed: Sep. 2, 1999
(86) PCT No.: PCT/EP99/06454
§ 371 (c)(1),
(2), (4) Date: May 20, 2002
(87) PCT Pub. No.: WO01/17913
PCT Pub. Date: Mar. 15, 2001

(51) Int. Cl.[7] .................................................. C02F 1/48
(52) U.S. Cl. ........................ 210/222; 210/695; 335/306
(58) Field of Search ................................. 210/222, 223, 210/695; 123/538; 335/302, 306

(56) References Cited

U.S. PATENT DOCUMENTS

| 5,378,362 A | 1/1995 | Schoepe |
| 5,837,143 A | 11/1998 | Mercier |
| 5,882,514 A * | 3/1999 | Fletcher ...................... 210/222 |

FOREIGN PATENT DOCUMENTS

| DE | 42 22 686 | 1/1994 | |
| DE | 296 17 935 | 12/1996 | |
| DE | 19532357 A1 * | 3/1997 | ............. C02F/1/48 |
| DE | 198 10 283 | 9/1999 | |
| EP | 0 427 241 | 5/1991 | |

OTHER PUBLICATIONS

Derwent–Acc–No: 1997–180678; Engliish Abstract for DE 19532357 A1 which is cited in the Foreign Documnets Section of this PTO–892.*

Derwent–Acc–No: 1995–519504; English Abstract for DE 19810283 A1 which is cited in the Foreign Documnets Section of the Applicants Information Disclosure Statement form PTO–1449 which was recieved oin Jul. 29, 2002.*

* cited by examiner

Primary Examiner—David A. Reifsnyder
(74) Attorney, Agent, or Firm—Harrison & Egbert

(57) ABSTRACT

A permanent magnetic liquid treatment device, including a tubular housing in which ring magnets and magnetizable spacer discs are located, coaxially to the longitudinal axis of the housing, and which has contact pieces at both ends. The device also has mechanisms which produce a screw motion in the liquid passing through and an inner tube which is located in the housing, coaxially to the longitudinal axis thereof and at a distance from the inner housing pieces. The ring magnet and spacer discs are in the liquid-free area between the inner tub and the tubular housing in such a way that they lie one behind the other in the direction of the longitudinal axis of the housing. The stacks of ring magnets and spacer discs are held in place in such a way that it cannot move and is tightly enclosed by means of sleeved screwed onto the contact pieces.

14 Claims, 1 Drawing Sheet

US 6,752,923 B1

PERMANENT MAGNETIC LIQUID TREATING DEVICE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a permanent magnetic liquid treating device comprising a tubular housing in which ring magnets and magnetizable spacer discs are located, coaxially to the longitudinal axis of the housing, and which has connecting pieces at both ends, said device comprising means which cause a spiral motion of the liquid passing therethrough, and an inner tube which is located in the housing, coaxially to the longitudinal axis thereof and at a distance from the inner wall of the housing, the ends of said inner tube being connected liquid-tight to said connecting pieces, and the ring magnets and spacer discs being installed in the liquid-free space between the inner tube and the tubular housing so that they lie one behind the other in the direction of the longitudinal axis of the housing.

BACKGROUND OF THE INVENTION

A permanent magnetic liquid treating device of this kind is known by German Patent No. DE 195 32 357 A1 and this document forms the basis of the pre-characterizing part of claim 1. Such devices, which are also known from other patent documents, are used especially for the magnetic treatment of water in order to avoid the formation of lime deposits at the inner wall of pipes and tanks by causing that the calcium carbonate which is dissolved in the water is deposited not at the walls but in the form of separable fine particles.

While the treating device referred to above is in principle suitable for this purpose, its effect is not yet fully satisfactory. The rotating turbine which in the known device is used for creating a spiral motion of the liquid flowing therethrough can not provide for a spiral motion which is constant over the total length of the device, and the construction of the known device furthermore causes an undesirable higher pressure drop.

BRIEF SUMMARY OF THE INVENTION

The object of the invention is therefore to improve a treating device of the above described type in such way that its construction is simplified and its effectiveness is clearly improved, that is that the formation of scale in pipes and tanks through which tap water flows but also in the liquid circulation of for example boilers or washing machines is avoided to an even higher degree.

This object is achieved by the dispositions of the characterizing part of claim 1. Preferred embodiments are described in the dependent claims.

By the cooperation of the specific coaxial arrangement of a stack of cylindrical ring magnets which are separated from each other by spacer discs consisting of metal and which surround an inner tube, with a helically wound strip consisting of a magnetizable rustproof metal, the width of which corresponds to the inner diameter of the inner tube and which is arranged in, said inner tube, the desired helical motion of the liquid flowing therethrough is realized in an even manner and practically without pressure drop and without moving parts, and an improvement of the magnetic flow which acts upon the molecules of the water flowing therethrough is achieved. The device according to the invention is of notably simple construction and can be manufactured at low costs.

BRIEF DESCRIPTION OF THE SEVERAL VIEWS OF THE DRAWINGS

Further features and advantages of the invention will become apparent by the following description of an embodiment, by way of example, and without limitation, referring to the attached drawings.

DETAILED DESCRIPTION OF THE INVENTION

Figure 1:
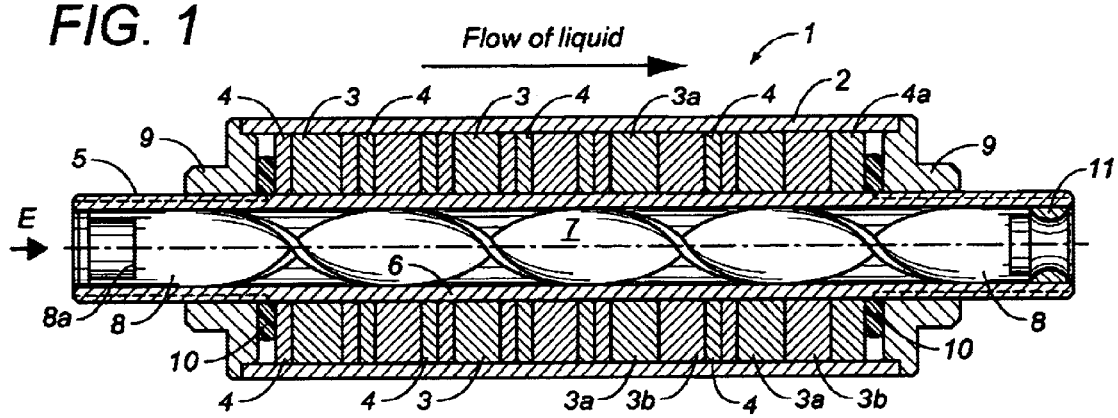
FIG. 1 a schematic view of an axial longitudinal section of a liquid treating device according to the invention, the strip being shown in side view.

The permanent magnetic liquid treating device 1 shown in FIG. 1 comprises a tubular housing 2 in which ring magnets 3 and magnetizable spacer discs 4 are arranged coaxially to the longitudinal axis of the housing and which at both ends comprises connecting pieces 5 which are formed in one piece with the inner tube 6 and form an extension thereof. The tubular housing 2 consists of a non-magnetizable material, here an aluminum alloy, while the inner tube 6 and the tubular connecting pieces 5 consists of a magnetizable rustproof metal, here special (stainless) steel, and the ring magnets and spacer discs are mounted one behind the other in form of a stack in the liquid-free space between the inner tube and the tubular housing. The stack is held unmovable and tightly enclosed in the housing by terminal sleeves 9 which are screwed on the connecting pieces 5 from both sides, an elastic sealing ring (0-ring) 10 being inserted between the stack and each sleeve. The terminal sleeves 9 preferably consists also of special steel.

Figure 2:
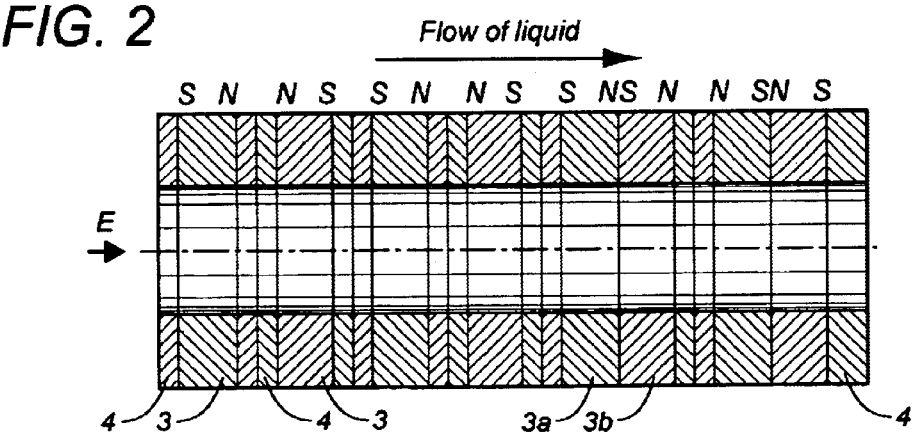
FIG. 2 is a schematic view of the arrangement of the ring magnets of FIG. 1 without the housing and inner tube.

In order to cause a helical movement of the liquid flowing therethrough, a strip 7 of magnetizable rustproof metal which is wound to 1 to 2 helical windings is arranged in the inner tube 6, the width of the strip corresponding to the inner diameter of the inner tube 6. This strip is fixedly connected at both ends with the tubular connecting pieces, for example by welding to the inner wall thereof. The stack of ring magnets 3 which are all alike and spacer discs 4 is arranged as shown in FIG. 2, so that beginning from the liquid inlet E, after a single spacer disc 4, a ring magnet 3 with its south pole at the inlet side, then is followed by two single spacer discs 4 and three ring magnets 3, each separated from the next by two spacer discs (4) and each with a polarization inverted from one to the next, and at last two twinned ring magnets 3a, 3b, again separated from the preceding ring magnet (3) and from each other by two spacer discs (4) and having a polarization which is inverted in respect to the preceding ring magnets and to the following twinned ring magnets, the single ring magnets 3a, 3b forming the twinned ring magnets contacting each other with opposite poles, so that at the outlet side of the stack there is a south pole, and the stack is terminated by a thicker spacer disc 4.

In the embodiment shown, the ring magnets have each an axial dimension of 9 mm and the spacer discs 4 an axial dimension of 3 mm, the last spacer disc at the outlet side having a thickness of 6 mm. Also in this example as shown, the inner tube 6 has a diameter of 0.5 inch (12.6 mm) and a length of 100 mm, and the helically wound strip is formed as a helix from a sheet of special steel of 0.5 mm thickness.

The helical windings of the wound strip lie within the inner tube 6, that is between the connecting pieces 5, and their number can be between 1 and 3, for example 2 as shown in FIG. 1. The helically wound strip 7 extends into both connecting pieces 5 with each a diametrical opposed terminal part 8 without helical winding and is in this part provided with a recess 8a in order to facilitate fixation at the connecting part 5, for example by spot welding.

Figure 3:
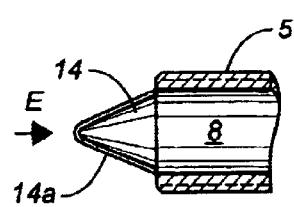
FIGS. 3 and 4 are detailed plan views of two other embodiments of the inlet terminal part of the strip of the device of FIG. 1.
Figure 4:
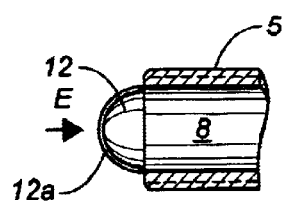

Optionally, the strip 7 can be formed without recess 8a at the inlet end thereof and can be provided with an inlet tip 14 which projects from the connecting piece 5 (FIG. 3). This tip is directed against the direction of the flow and is rounded in front and at the edges 14a and preferably, at least at the edge, provided with smooth plastic coating. Instead, the inlet tip 12 can also be rounded with rounded edges 12a and preferably also be provided with a plastic coating (at least at the edge) (FIG. 4). These smooth inlet tips avoid the attaching of fluff on the inlet edge of the metal strip 7. Optionally, the metal strip 7 can be coated with plastic material over all of its length.

If required, the flow section at the liquid outlet can be somewhat diminished by means of an insert 11 which is held at the end of the outlet connecting piece 5 in order to upwardly reduce the velocity of the liquid flow upwards of this end. In order to facilitate the installation of the permanent magnetic liquid treating device in a liquid conduct the connecting pieces 5 are provided at their end with an appropriate threading for connection to a pipe or provided with smooth ondulations for insertion in and fixation of connecting tubing.

I claim:

1. A permanent magnetic water treating device comprising:
    a tubular housing having disc-shaped ring magnets and magnetizable spacer discs located therein, said housing having a longitudinal axis, said ring magnets and said spacer discs extending coaxially to said longitudinal axis, said housing having a first connecting piece at one end thereof and a second connecting piece at an opposite end thereof, said housing having a means therein for causing a continuous spiral motion of the water passing through said housing; and
    an inner tube positioned in said housing coaxially to said longitudinal axis, said inner tube spaced at a distance from an inner wall of said housing, said inner tube having a first end connected in liquid-tight relationship to said first connecting piece, said inner tube having a second end connected in liquid-tight relationship to said second connecting piece, said inner tube suitable for allowing a flow of the water to be treated to pass therethrough, said ring magnets and said spacer discs being installed in a liquid-free space between said inner tube and said inner wall of said housing, said ring magnets and said spacer discs alternating in location along said longitudinal axis, said tubular housing being of a non-magnetizable material, said inner tube being of a magnetizable rustproof material, said first and second connecting pieces each being tubular and of a magnetizable rustproof material, said first and second connecting pieces extending from said ends of said inner tube so as to form a single piece therewith, at least one of said ring magnets being identical to each other, one of said ring magnets being positioned after one of said spacer discs at said first end of said inner tube such that a south pole of said ring magnet faces said first end, said first end being a water inlet, each of the other of said ring magnets being positioned after pairs of said spacer discs, said ring magnets comprising three ring magnets arranged with a polarity inverted sequentially between one another, said ring magnets further comprising at least two twinned magnets having polarities inverted with respect to an adjacent ring magnet of said three ring magnets and with respect to each other, each magnet of said twinned magnets contacting each other with opposite poles such that a south pole faces said second end of said inner tube, said spacer discs comprising an end spacer disc which is thicker than the other of said spacer discs, said end spacer disc positioned against the south pole of said twinned magnets adjacent said second end of said inner tube, said ring magnets and said spacer discs being tightly enclosed in immovable relation within said housing by a pair of sleeves screwed respectively on said first and second connecting pieces, said inner tube having a strip therein formed of a magnetizable rustproof metal having a width corresponding to an inner diameter of said inner tube, said strip being wound into a helix having one to three turns, said strip having end sections extending respectively into said first and second connecting pieces, said end sections being of non-helix form and diametrically opposed to each other.

2. The device of claim 1, said housing being of an aluminum or aluminum alloy material, said inner tube and said first and second connecting pieces and said pair of end sleeves being of a stainless steel material.

3. The device of claim 1, each of said three ring magnets having an axial thickness of 9 millimeters, each of said spacer discs having an axial thickness of 3 millimeters, said end spacer disc having an axial thickness of 6 millimeters.

4. The device of claim 1, said inner tube having a diameter of 0.5 inch and a length of 100 millimeters, said strip being of a stainless steel material having a thickness of 0.5 millimeters and between one and two helix windings within said inner tube.

5. The device of claim 1, further comprising:
    a first elastic sealing ring surrounding said inner tube and positioned between one of said spacer discs and one of said pair of sleeves; and
    a second elastic sealing ring surrounding said inner tube and positioned between another said spacer discs and another of said pair of sleeves.

6. The device of claim 1, said strip being smooth.

7. The device of claim 1, said strip having projection thereon suitable for causing turbulence in the water passing through said inner tube.

8. The device of claim 1, said end section of said strip at said water inlet extending outwardly from said first connecting piece so as to terminate in a tip with rounded straight edges.

9. The device of claim 8, said tip having a coating of polymeric material.

10. The device of claim 1, said end section of said strip at said water inlet extending outwardly from said first connecting piece so as to terminate in a rounded tip with a rounded round edge.

11. The device of claim 10, said tip having a coating of polymeric material.

12. The device of claim 1, said second connecting piece being positioned at said outlet end of said inner tube, said second connecting piece having an insert thereon so as to reduce a flow section of said inner tube.

13. The device of claim 1, each of said first and second connecting pieces having an outer surface having a threading thereon suitable for connection to another tube.

14. The device of claim 1, each of said first and second connecting pieces having smooth undulations thereon suitable for connection to another tube.

* * * * *